US010067953B2

(12) United States Patent
Borley et al.

(10) Patent No.: US 10,067,953 B2
(45) Date of Patent: Sep. 4, 2018

(54) INDEXING A CHAMELEON SCHEMA

(71) Applicant: International Business Machines Corporation, Armonk, NY (US)

(72) Inventors: Andrew J. Borley, Blandford Forum (GB); Callum P. Jackson, Fareham (GB); Philip L. Norton, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 14/707,083

(22) Filed: May 8, 2015

(65) Prior Publication Data
US 2016/0328424 A1    Nov. 10, 2016

(51) Int. Cl.
*G06F 7/00* (2006.01)
*G06F 17/00* (2006.01)
*G06F 17/30* (2006.01)

(52) U.S. Cl.
CPC .. *G06F 17/30292* (2013.01); *G06F 17/30911* (2013.01)

(58) Field of Classification Search
CPC ............. G06F 17/2241; G06F 17/2247; G06F 17/30917; G06F 17/30292; G06F 17/30911
USPC ................................ 707/694, 803, 808, 964
See application file for complete search history.

(56) References Cited

U.S. PATENT DOCUMENTS

| 7,685,512 B2 | 3/2010 | Hanson et al. |
| 8,370,399 B2 | 2/2013 | Kitsis et al. |
| 2003/0140308 A1* | 7/2003 | Murthy ............. G06F 17/30917 715/234 |
| 2005/0120029 A1* | 6/2005 | Tomic ............... G06F 17/30917 |
| 2005/0160164 A1* | 7/2005 | Benfield ............. G06F 17/2229 709/223 |
| 2007/0050707 A1* | 3/2007 | Liu .......................... G06F 8/37 715/234 |
| 2010/0235725 A1 | 9/2010 | Drayton et al. |

(Continued)

OTHER PUBLICATIONS

Kawaguchi, K., "W3C XML Schema: DOs and DON'Ts", pp. 1-7, last modified May 31, 2001. http://www.kohsuke.org/xmlschema/XMLSchemaDOsAndDONTs.html#avoid_chameleon.

(Continued)

*Primary Examiner* — Md I Uddin
(74) *Attorney, Agent, or Firm* — Nicholas D. Bowman

(57) ABSTRACT

A system for validating a document against an encompassing schema and at least one referenced chameleon schema, comprising: a working schema register for storing a working schema using the encompassing schema as a starting point; chameleon schema identifier for identifying a chameleon schema encompassed by the encompassing schema; an existing indexed schema engine for incorporating an existing indexed schema into the working indexed schema if there is an existing indexed schema associated with the encompassing schema and the chameleon schema; a new indexed schema engine for creating a new indexing schema based on the chameleon schema and the encompassing schema namespace and incorporating said new indexed schema into the working schema if there is no existing indexed schema associated with the encompassing schema and chameleon schema; and a schema validator for validating the document using the working schema.

5 Claims, 6 Drawing Sheets

(56) References Cited

U.S. PATENT DOCUMENTS

2012/0084330 A1* 4/2012 Huynh .............. G06F 17/30908
　　　　　　　　　　　　　　　　　　　　　707/810

OTHER PUBLICATIONS

Obasanjo, D., "W3C XML Schema Design Patterns: Avoiding Complexity", Topic 14, XML.com, pp. 1-10, Nov. 20, 2002. http://www.xml.com/pub/a/2002/11/20/schemas.html?page=3.

Obasanjo, D., "W3C XML Schema Design Patterns: Avoiding Complexity", Topic 14: Why you should use chameleon schemas carefully, Microsoft Corporation, (originally published on http://www.xml.com), pp. 1-11, Jan. 2003. https://msdn.microsoft.com/en-us/library/aa468564.aspx#xmlscmavd cmplx_topic14.

Van Der Vlist, E., "10.9 Importing Schemas with No Namespaces", XML Schema, Chapter 10, First Edition, Jun. 2002, pp. 1-4, © 2002 O'Reilly & Associates, Inc., Sebastopol, CA. http://docstore.mik.ua/orelly/xml/schema/ch10_09.htm.

* cited by examiner

INDEXING A CHAMELEON SCHEMA

BACKGROUND

The field of the invention relates to indexing a chameleon schema in a markup language schema for document validation.

The general environment of the invention relates to document markup validation for markup documents.

SUMMARY

In a first aspect of the invention there is provided a system for validating a document against an encompassing schema and at least one referenced chameleon schema, the encompassing schema and the chameleon schema containing data definitions for validation against data contained by the document, the system comprising: a working schema register for storing a working schema using the encompassing schema as a starting point; a chameleon schema identifier for identifying a chameleon schema encompassed by the encompassing schema; an existing indexed schema engine for incorporating an existing indexed schema into the working indexed schema if there is an existing indexed schema associated with the encompassing schema and the chameleon schema; a new indexed schema engine for creating a new indexing schema based on the chameleon schema and the encompassing schema namespace and incorporating said new indexed schema into the working schema if there is no existing indexed schema associated with the encompassing schema and chameleon schema; and a schema validator for validating the document using the working schema.

In a second aspect of the invention there is provided a method for validating a document against an encompassing schema and at least one referenced chameleon schema, the encompassing schema and the chameleon schema containing data definitions for validation of data contained by the document, the method comprising: building a working schema using the encompassing schema as a starting point; identifying a chameleon schema encompassed by the encompassing schema; incorporating an existing indexed schema into the working indexed schema if there is an existing indexed schema associated with the encompassing schema and the chameleon schema; creating a new indexing schema based on the chameleon schema and the encompassing schema namespace and incorporating said new indexed schema into the working schema if there is no existing indexed schema associated with the encompassing schema and chameleon schema; and validating the document using the working schema.

When an encompassed schema is identified as a chameleon schema, then schema indexing will first create a unique key for the chameleon schema, for example, a file hash code. The combination of the file hash code and target namespace will be checked to determine if there is an existing schema index. If an existing schema index is not available then the schema indexing method will start indexing of the chameleon schema and then return and store the resulting indexing schema. This method produces performance gains where larger chameleon schemas are repeated used across a large system.

In a third aspect of the invention there is provided a computer program product for validating a document against an encompassing schema and at least one referenced chameleon schema, said document containing data and said encompassing schema and said chameleon schema containing data definitions for validating against, the computer program product comprising: a computer-readable storage medium (or media) having computer-readable program instructions thereon for causing a processor to carry out the following steps: building a working schema using the encompassing schema as a starting point; identifying a chameleon schema encompassed by the encompassing schema; incorporating an existing indexed schema into the working indexed schema if there is an existing indexed schema associated with the encompassing schema and the chameleon schema; creating a new indexing schema based on the chameleon schema and the encompassing schema namespace and incorporating said new indexed schema into the working schema if there is no existing indexed schema associated with the encompassing schema and chameleon schema; and validating the document using the working schema.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

BRIEF DESCRIPTION OF THE DRAWINGS

Preferred embodiments of the present invention will now be described, by way of example only, with reference to the following drawings in which.

DETAILED DESCRIPTION

Aspects of the present disclosure provide for a validator that can process Chameleon schemas by detecting common reuse across chameleon schemas. When the schema validator is indexing a schema and identifies that a reference schema is a Chameleon Schema, the processing may first create a unique key for the reference Chameleon schema—e.g. a file hashcode. The validator can look up the combination of the file hashcode and target namespace to determine if an existing indexing has occurred. If existing indexing is not available, then the validator can start the standard indexing of the Chameleon schema and store the resulting indexing for future use.

Figure 1:
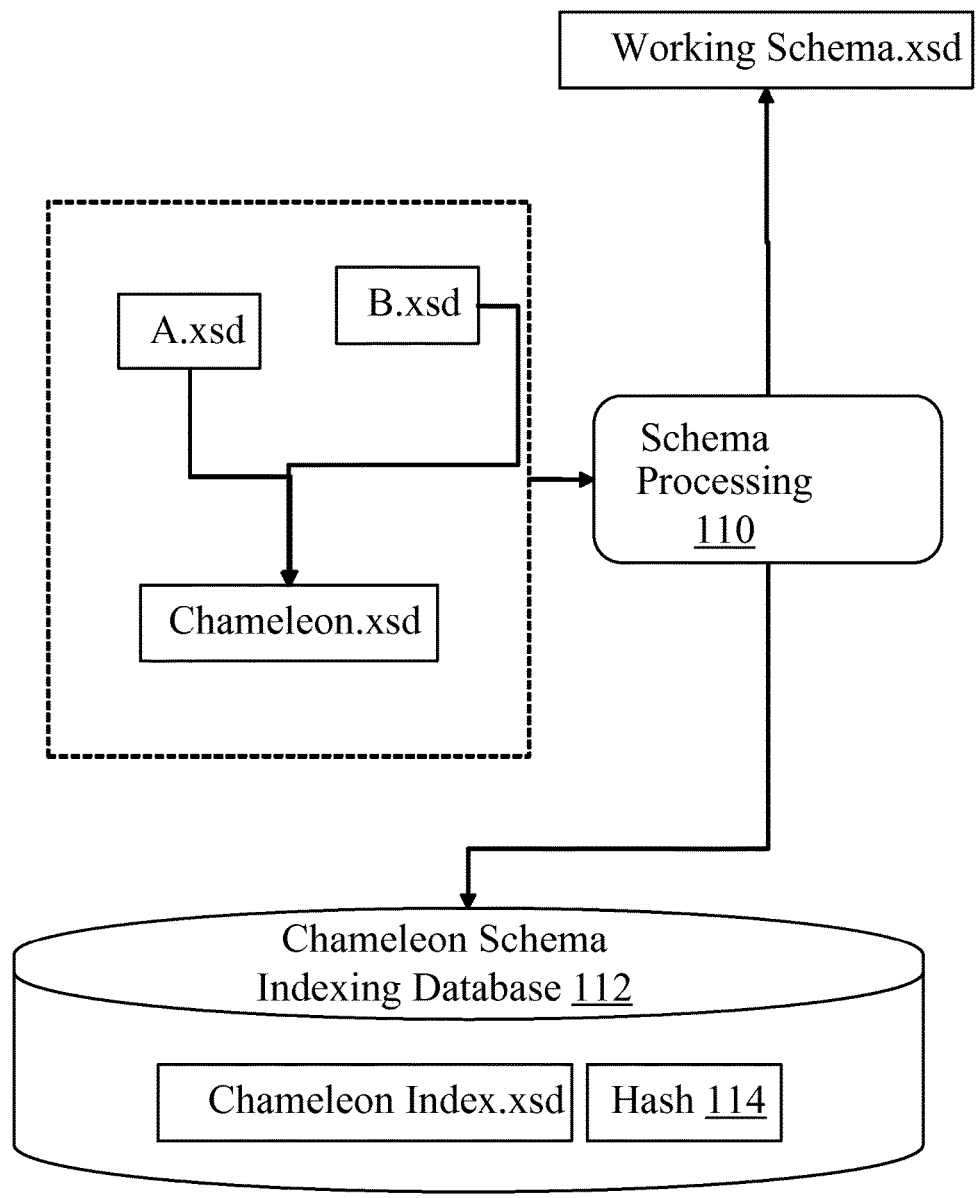
FIG. 1 is a high level example of a chameleon schema and encompassing schemas for processing into a working schema.

Referring to FIG. 1, a high level example comprises a chameleon schema (chameleon.xsd) associated with two encompassing schemas (A.xsd and B.xsd). The end result of processing chameleon.xsd and either A.xsd or B.xsd is a working schema (Working Schema.xsd). A chameleon schema is a standard XML (extendable markup language) schema file except that it does not contain a target namespace (see Chameleon A.xsd in FIG. 1 where "A" is a file name and ".xsd" is a file name extension denoting schema code), instead it inherits the target namespace of an encompassing schema. When a chameleon schema is referenced in another schema (the encompassing schema, for example, A.xsd or B.xsd in FIG. 1) the type definitions and declarations in the chameleon schema will acquire the target namespace of the enclosing schema in the resulting schema index. Schema validation of chameleon schema is challenging as it can be processor and memory intensive and especially as the number of schemas referencing the chameleon schema increases. Each schema referencing a chameleon schema will cause an indexing duplication to occur as the target namespace of the enclosing schema needs to be used. In many situations the encompassing schemas of a chameleon schema may have the same target namespace. For a schema validator, a schema process may index a new chameleon schema for each enclosing schema.

For example, A.xsd and B.xsd may require validation because both reference Chameleon.xsd. In this example, both of the enclosing schemas have a target namespace of example.org. The system may include a Schema Processing subsystem 110 that can process A.xsd and identify that it includes Chameleon.xsd. After checking the Chameleon schema (or based on a cached lookup), the Schema Processing subsystem 110 can identify that Chameleon.xsd is a Chameleon schema. The Schema Processing subsystem 110 can generate a hashcode for the Chameleon Schema file (e.g., Chameleon.xsd) and use both the hashcode and the target namespace from A.xsd to check the Chameleon Schema Indexing database 112 to determine if an existing index is available.

In this example, this is the first time the Chameleon has been processed for the target namespace and a match is not found in the database. Next, the Schema Processing subsystem 110 can process the Chameleon.xsd and store the result in the Chameleon Schema Indexing database 112. The Schema Processing subsystem 110 can process B.xsd and identify that B.xsd includes Chameleon.xsd. After checking the Chameleon schema (or based on a cached lookup), the Schema Processing subsystem 110 identifies that Chameleon.xsd, a Chameleon schema. The Schema Processing subsystem 110 can generate a hashcode 114 for the Chameleon Schema file. The Schema Processing subsystem 110 can use the hashcode 114 and the target namespace from B.xsd to check the Chameleon Schema Indexing database 112 to determine if an existing index is available. If there is an existing index, the Chameleon Schema Indexing database 112 may return the index from previous processing operations, and therefore by-pass any further processing requirements of the Chameleon schema in this instance.

Figure 2:
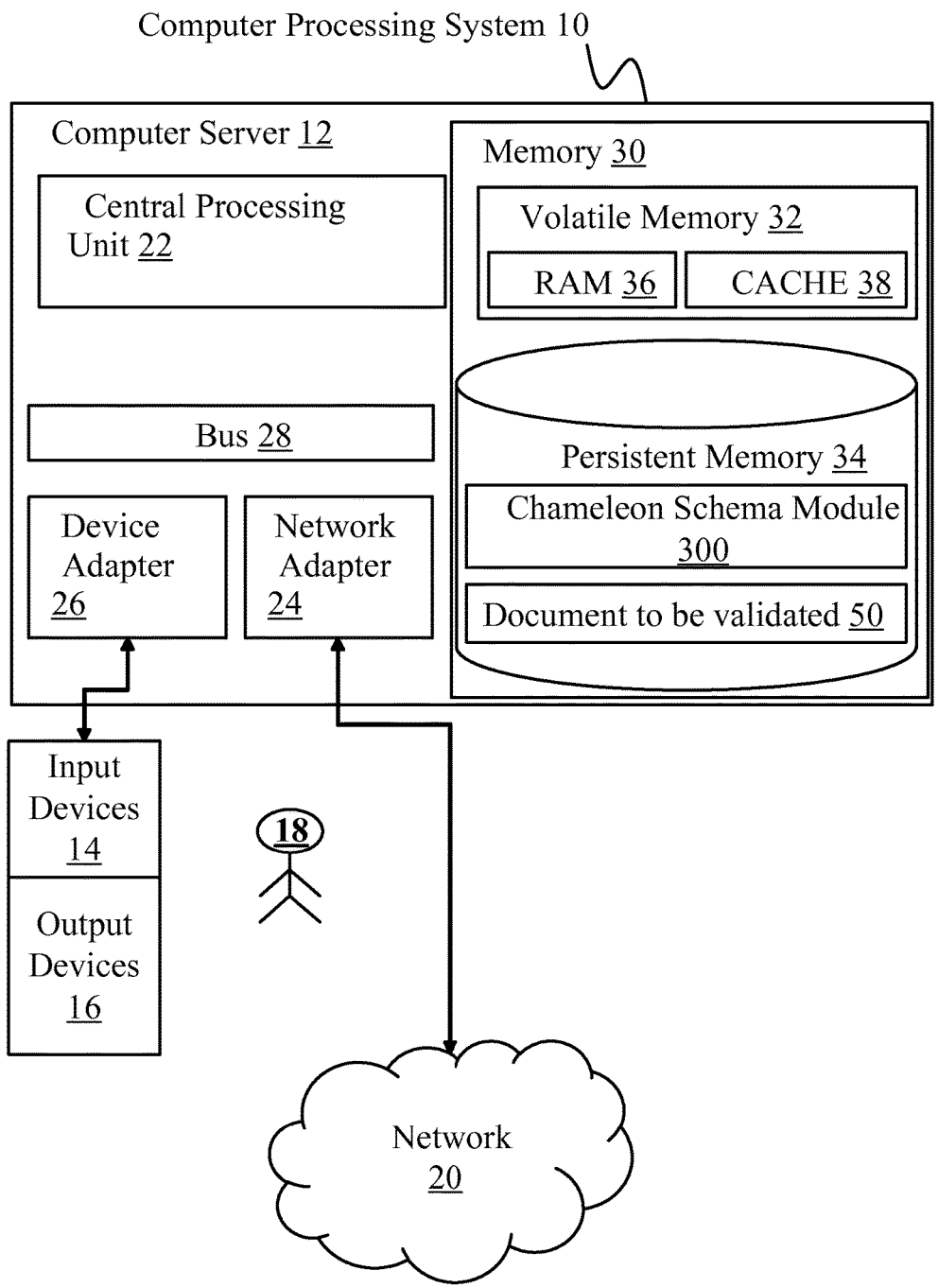
FIG. 2 is a deployment diagram of a chameleon schema module in a computer processing system of the preferred embodiment.

Referring to FIG. 2, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment, for example, where a computer processing system is a third party service performed by one or more of a plurality computer processing systems. A distributed computer environment also includes an Internet of things computing environment for example where a computer processing systems are distributed in a network of objects that can interact with a computing service.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises chameleon schema module 300 and document to be validated 50. In one embodiment, ROM in the memory 30 stores chameleon schema module 300 that enables the computer server 12 to function as a special purpose computer specific to the module 300. Further program modules that support the preferred embodiment but are not shown include firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Figure 3:
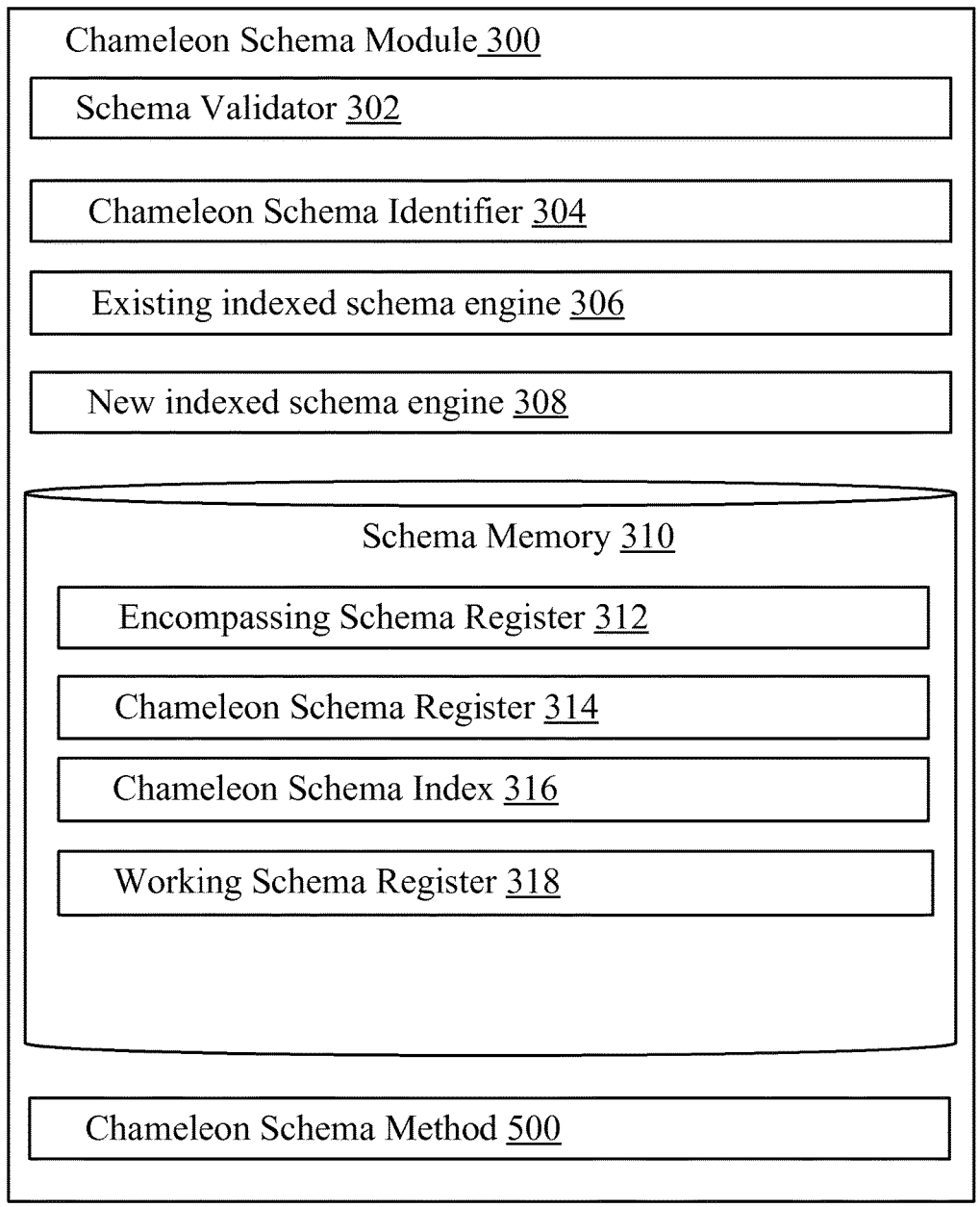
FIG. 3 is a component diagram of the chameleon schema module of the preferred embodiment.

Referring to FIG. 3, chameleon module 300 comprises the following components: schema validator 302; chameleon schema identifier 304; existing indexed schema engine 306; new indexed schema engine 308; schema memory 310; and chameleon schema method 500.

Schema validator 302 is for validating a document (document to be validated 50) using a working schema, that is, a schema that is logically self-consistent and not an encompassing schema or a chameleon schema. Schema validator 302 is also for validating the schemas against generic XML rules.

Chameleon schema identifier 304 is for identifying a chameleon schema within an encompassing schema. Identification occurs when a referenced schema is located that does not have a namespace.

Existing indexed schema engine 306 is for using an existing indexed schema when a chameleon schema has been indexed for a prior encompassing schema. In various embodiments, the existing indexed schema is a schema that exists before any modification to the encompassing schema. The existing indexed schema can predate the encompassing schema. The existing indexed schema can be independent from the encompassing schema. The term existing index schema can also be referred to as a first indexed schema and the new indexed schema can be referred to as the second indexed schema.

New indexed schema engine 308 is for creating a new index schema when there is no existing index schema for a chameleon schema. The new indexed schema may be created from the encompassing schema and the chameleon schema. Thus, the new indexed schema does not pre date the encompassing schema or the chameleon schema. The date of the various indexed schemas can be based off of metadata.

Schema memory 310 is for storing the final working schema and schema variable used complete the working schema. Schema memory 310 comprising: encompassing schema register 312; chameleon schema register 314; chameleon schema index repository 316; and working schema register 318.

Encompassing schema register 312 is for storing one or more encompassing schemas.

Chameleon schema register 314 is for storing one or more chameleon schemas.

Chameleon schema index 316 is for storing one or more chameleon schema indexes. A chameleon schema index is an index that points to a chameleon schema that has been indexed.

Working schema register 318 is for storing a working schema. A working schema is the final schema after an encompassing schema and a chameleon schema have been combined into a schema that may be used to validate a document.

Figure 4A:
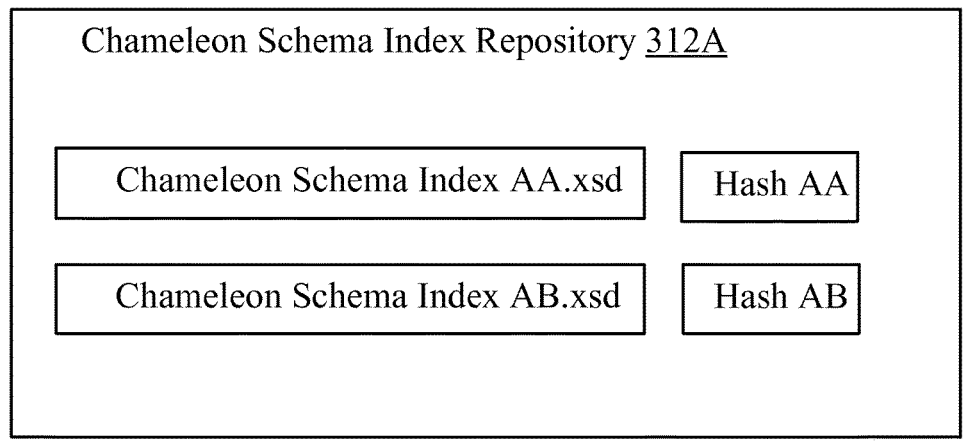
FIG. 4A is a preferred embodiment of a chameleon schema index repository including hash files.

Referring to FIG. 4A, there is shown an example of a preferred embodiment of a chameleon schema index repository 312A including hash files. In this embodiment, for each chameleon schema index a hash file is created of the contents of the chameleon schema index and the corresponding namespace. Therefore, in this example, hash AA represents the hashing of the contents of chameleon schema index AA.xsd and namespace X. Hash AB represents the hashing of the contents of chameleon schema index AB.xsd and namespace Y. Such hashing allows a more reliable and faster match of a schema index and a namespace than if no hashing is used such as in the second embodiment below.

Figure 4B:
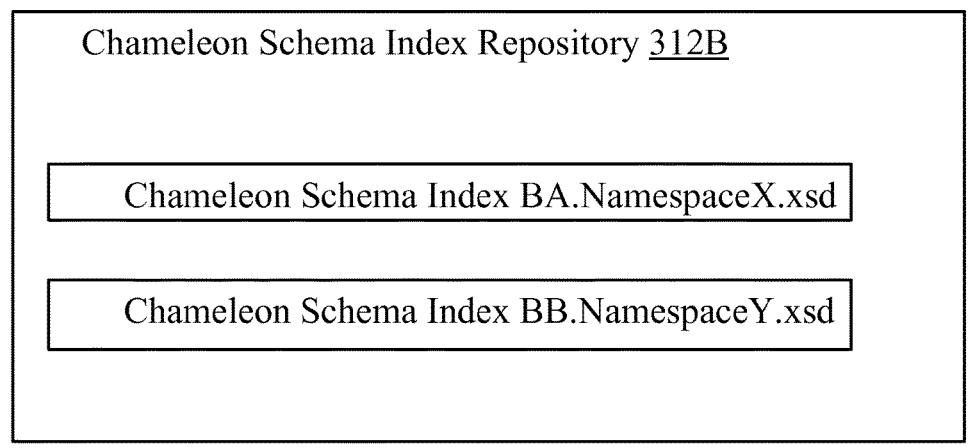
FIG. 4B is an alternative embodiment of a chameleon schema index repository without hash files.

Referring to FIG. 4B, there is shown an example of an alternate embodiment of a chameleon schema index repository 312B without hash files. In this embodiment, for each chameleon schema index file, the name of the chameleon schema index file is changed to include the namespace. Therefore, in this example, the file name "Chameleon Schema Index BA.NamespaceX.xsd" represents a schema index created from chameleon schema AA and namespace X. The file name "Chameleon Schema Index BB.NamespaceY.xsd" represents a schema index created from chameleon schema BB and namespace Y.

Figure 5:
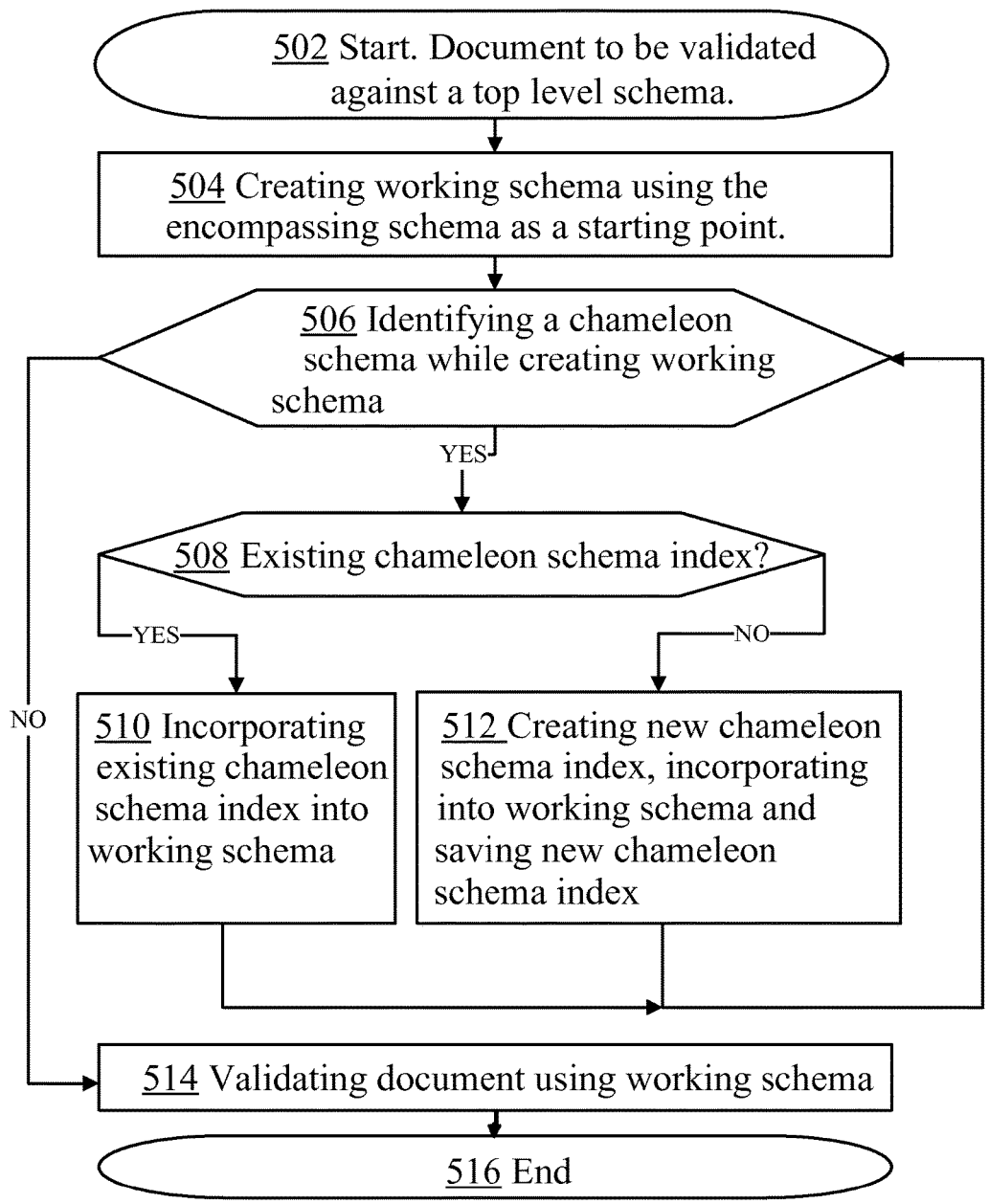
FIG. 5 is a flow diagram of a process of the chameleon schema module of the preferred embodiment.

Referring to FIG. 5, chameleon schema method 500 comprises logical process steps 502 to 516.

Step 502 is the start of method 500 when a document is requested to be validated against a top level schema. Both document and schema are referenced when method 500 is invoked. The method may be called by a general method of validating document against a schema when the schema is known to be an encompassing schema or the method can validate a document for schemas that are not necessarily encompassing schemas but later discovered to be encompassing schemas, or not. The top-level schema may be an encompassing schema. The encompassing schema may be a schema that references a chameleon schema. The chameleon schema may add to the encompassing schema.

Step 504 is for creating a working schema using the referenced schema as a starting point (the referenced schema may or may not be known to be an encompassing schema). Step 504 is also for validating the referenced schema against generic XML rules.

Step 506 is for branching to step 508 if a chameleon schema is identified in the referencing schema while creating a working schema. In this case then the referencing schema is an encompassing schema. If no chameleon schema is identified in the referenced schema, then the working schema may be identical to the referenced schema and processing branches to step 514.

Step 508 is for branching to step 510 if an existing chameleon schema index exists for the chameleon schema identified in step 506. If not then processing branches to step 512. In the preferred embodiment, a hash code is formed from the namespace of the encompassing schema and the chameleon schema index, if such a hash code exists in the chameleon schema index repository then an existing chameleon schema index exists. In a second embodiment, a file name is formed from chameleon schema and the encompassing schema namespace, if such a file name exists in the chameleon schema index then it is assumed to be an existing chameleon schema index.

Step 510 is for incorporating the existing chameleon schema index into the working schema index. The existing chameleon schema index is inserted at the appropriate point in the working schema. Processing branches back to step 506 where any further chameleon schemas are identified in the encompassing schema or identified chameleon schemas.

Step 512 is for creating a new chameleon schema index by combining the namespace of the encompassing schema with the chameleon schema. The new chameleon schema index is incorporated into the working schema by inserting at the appropriate point in the working schema. The new chameleon schema index is saved in the chameleon schema index repository for future used and incorporation without the need for combining a namespace. Processing branches back to step 506 where any further chameleon schemas are identified in the encompassing schema or identified chameleon schemas. Step 512 is also for validating the chameleon schema against generic XML rules. One advantage of the embodiments is that the validation step needs to be performed only once per chameleon schema. In the preferred embodiment it is an index reference to the chameleon schema that is physically coded into the working schema. However, in another embodiment, it is envisaged that the chameleon schema may itself be physically coded into the working schema.

Step 514 is for validating a document using the working schema.

Step 516 is the end of the chameleon schema method.

An example of an embodiment of the disclosure is described. A chameleon schema of FIG. 1 is chameleon.xsd and comprises lines 1.1 to 1.13 of XML code below:

```
1.1   <?xml version="1.0"?>
1.2   <xsd:schema xmlns:xsd="www.w3.org/2001/XMLSchema"
1.3          elementFormDefault="qualified">
1.4     <xsd:element name="Address">
1.5       <xsd:complexType>
1.6         <xsd:sequence>
1.7           <xsd:element name="HouseNumber"
                 type="xsd:string"/>
1.8           <xsd:element name="Street"
                 type="xsd:string"/>
1.9           <xsd:element name="City" type="xsd:string"/>
1.10        </xsd:sequence>
1.11      </xsd:complexType>
1.12    </xsd:element>
1.13  </xsd:schema>
```

It can be seen that chameleon.xsd does not contain a namespace variable and that makes the schema a chameleon schema.

A first schema that references chameleon.xsd is A.xsd. A.xsd comprises lines 2.1 to 2.12 of XML code below:

```
2.1   <?xml version="1.0"?>
2.2   <xsd:schema xmlns:xsd="www.w3.org/2001/XMLSchema"
       elementFormDefault="qualified" targetNamespace="example.org"
       xmlns:tns="example.org">
2.3     <xsd:include schemaLocation="Chameleon.xsd"/>
2.4     <xsd:element name=Order">
2.5       <xsd:complexType>
2.6         <xsd:sequence>
2.7           <xsd:element name="OrderNumber"
                 type="xsd:string"/>
2.8           <xsd:element ref="tns:Address"/>
2.9         </xsd:sequence>
2.10      </xsd:complexType>
2.11    </xsd:element>
2.12  </xsd:schema>
```

Lines 2.2 includes a namespace variable.
Line 2.3 includes a reference to the chameleon.xsd.
The second schema B.xsd comprises lines 3.1 to 3.13 of XML code:

```
3.1   <?xml version="1.0"?>
3.2   <xsd:schema xmlns:xsd="www.w3.org/2001/XMLSchema"
       elementFormDefault="qualified" targetNamespace="example.org"
       xmlns:tns="example.org">
3.3     <xsd:include schemaLocation="Chameleon.xsd"/>
3.4     <xsd:element name="CustomerAccount">
3.5       <xsd:complexType>
```

```
3.6         <xsd:sequence>
3.7           <xsd:element name="CustomerID"
              type="xsd:string"/>
3.8           <xsd:element name="CustomerName"
              type="xsd:string"/>
3.9           <xsd:element ref="tns:Address"/>
3.10        </xsd:sequence>
3.11      </xsd:complexType>
3.12    </xsd:element>
3.13  </xsd:schema>
```

Line 3.2 includes a namespace variable.

Line 3.3 references to chameleon.xsd.

In both schemas A.xsd and B.xsd, Chameleon.xsd is included and the targetNamespace of that schema will be example.org. When the chameleon schema method processes the A.xsd and B.xsd (normally prior to validating a document) it will process all the referenced schema. When the chameleon schema method processes A.xsd it will notice the chameleon.xsd reference and attempt to determine if it has processed {example.org} already. In this case as it is the first time it will not be found and the processing for the schema will occur.

When B.xsd is processed the {example.org} address can be found again. This time the validator identifies that the schema already exists and no further processing would be required.

Figure 6:
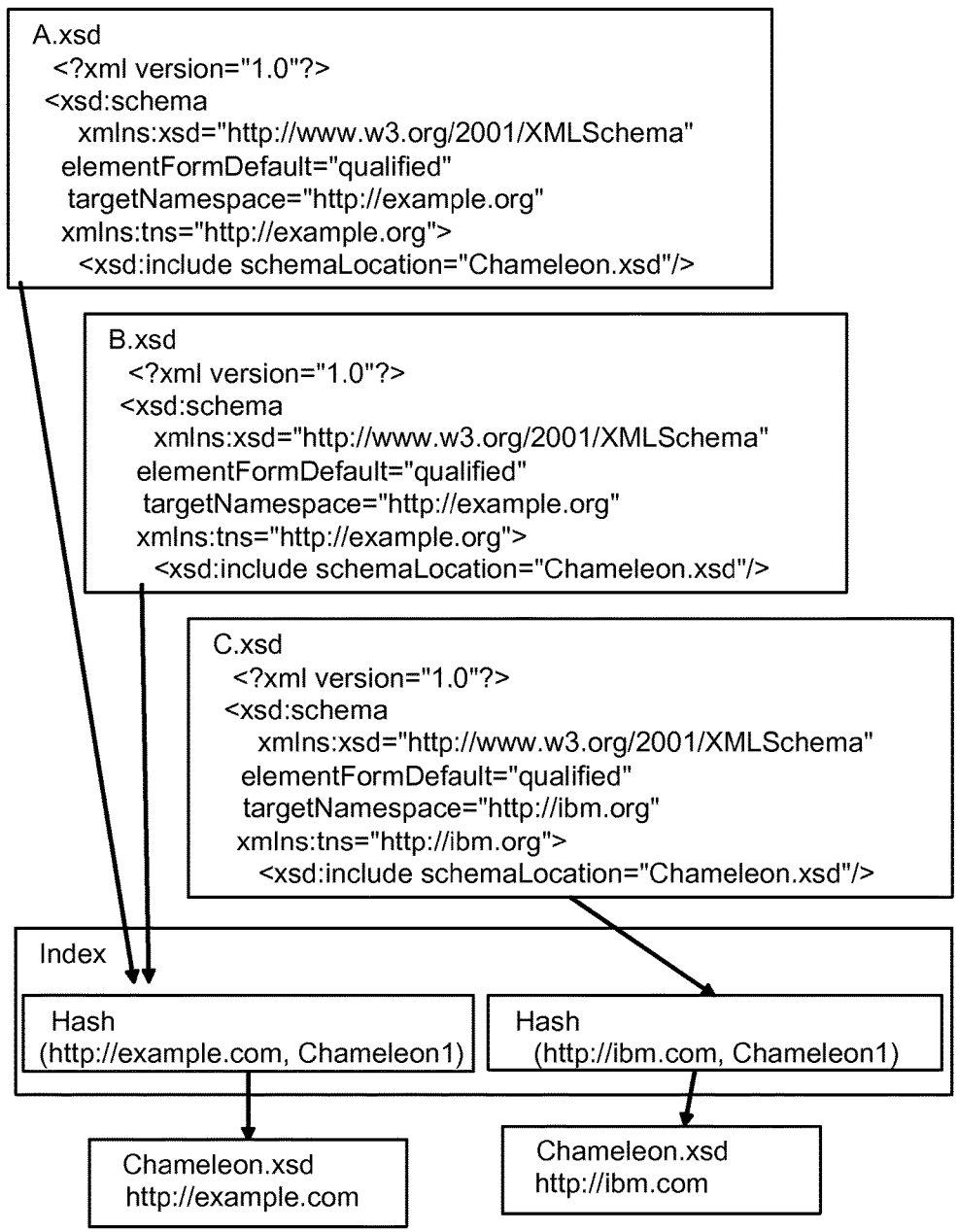
FIG. 6 is schematic diagram of three encompassing schemas and two respective referenced chameleon schemas.

Referring to FIG. 6, three encompassing schemas A.xsd, B.xsd and C.xsd reference two different indexed versions of the same chameleon schema (i.e., chameleon.xsd). It can be seem that a further example encompassing schema C.xsd having a different target namespace ("ibm.com") references the same chameleon schema. However, because the ibm.com namespace is different from the example.org namespace then a new instance of the chameleon schema is created and a new hash created from the namespace and the chameleon schema is saved in the index.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fibre-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A computer processing system said computer processing system comprising:
   a memory, the memory containing a document file, an encompassing schema file, and a chameleon schema file; and
   the processor in communication with the memory, the processor configured to obtain instructions from the memory that cause the processor to automatically validate a markup document contained in the document file against an encompassing schema contained in the encompassing schema file, and at least one referenced chameleon schema contained in the chameleon schema file, wherein the encompassing schema references the at least one referenced chameleon schema, said document file containing data and said encompassing schema and said chameleon schema containing data definitions for validation;
   a working schema register, contained in the memory, that is configured to store, in a file in the memory, a working schema using the encompassing schema as a starting point;
   a chameleon schema identifier, contained in the memory, that is configured to identify a chameleon schema, contained in the chameleon schema file, encompassed by the encompassing schema, wherein the chameleon schema identifier is further configured to identify a namespace within said encompassing schema using a unique key, contained in a hash file in the memory, the unique key generated from the namespace and the chameleon schema, wherein an existing chameleon schema index is associated with the namespace and the chameleon schema, the namespace being contained in a file in the memory;
   an existing indexed schema engine, contained in the memory, that is configured to incorporate a first indexed schema into the working schema if there is a first schema associated with the encompassing schema and the chameleon schema;
   a new indexed schema engine, contained in the memory, that is configured to create a second indexed schema based on the chameleon schema and the encompassing schema namespace and incorporating said second indexed schema into the working schema if there is no first indexed schema is associated with the encompassing schema and chameleon schema; and
   a schema validator, contained in the memory, that is configured to validate the document using the working schema.

2. The system of claim 1, wherein the schema validator is further configured to validate the encompassing schema against generic schema rules contained in the memory.

3. The system of claim 1, wherein the schema validator is further configured to validate the second indexed schema, contained in the memory, against generic schema rules contained in the memory if there is no first indexed schema associated with the encompassing schema and chameleon schema.

4. A method, performed by a computer processing system including a processor and a memory, said method comprising:
   automatically validating, with the processor, a markup document contained in a document file against an encompassing schema contained in an encompassing schema file that references at least one chameleon schema, contained in a chameleon schema file, said document file containing data and said encompassing schema and said chameleon schema containing data definitions for validation, wherein the automatically validating comprises:

building, with a working schema register, contained in the memory, a working schema using the encompassing schema as a starting point, the working schema and the encompassing schema contained in files in the memory;

identifying the chameleon schema encompassed by the encompassing schema;

automatically identifying, with the processor, a namespace within said encompassing schema using a unique key generated from the namespace and the chameleon schema, wherein an existing chameleon schema index is associated with the namespace and the chameleon schema;

incorporating a first indexed schema into the working indexed schema in response to the first indexed schema being associated with the encompassing schema and the chameleon schema;

creating a second indexed schema, contained in a file in the memory, based on the chameleon schema and the encompassing schema namespace and incorporating said second indexed schema into the working schema in response to the first indexed schema not being associated with the encompassing schema and chameleon schema; and validating the document using the working schema.

5. A computer program product the computer program product comprising: a non-transitory computer-readable storage medium having computer-readable program instructions thereon for causing the processor to carry out the following steps:

automatically validating, with a processor, a markup document contained in a document file, against an encompassing schema contained in an encompassing schema file and at least one referenced chameleon schema, contained in a chameleon schema file, said document file containing data and said encompassing schema and said chameleon schema containing data definitions for validating against, wherein the automatically validating comprises:

building, with a working schema register, contained in the memory, a working schema using the encompassing schema as a starting point, the working schema and the encompassing schema contained in files in the memory;

identifying the chameleon schema encompassed by the encompassing schema;

automatically identifying a namespace within said encompassing schema using a unique key generated from the namespace and the chameleon schema, wherein a new chameleon schema index is associated with the namespace and the chameleon schema;

incorporating a first indexed schema into the working indexed schema in response to the first indexed schema being associated with the encompassing schema and the chameleon schema;

creating a second indexed schema, contained in a file in the memory, based on the chameleon schema and the encompassing schema namespace and incorporating said second indexed schema into the working schema in response to the first indexed schema not being associated with the encompassing schema and chameleon schema; and validating the document using the working schema.

* * * * *